United States Patent
Sato et al.

(10) Patent No.: US 6,428,389 B2
(45) Date of Patent: Aug. 6, 2002

(54) POLISHING APPARATUS

(76) Inventors: Shuzo Sato; Hiizu Ootorii; Takaaki Kozuki, all of c/o Sony Corporation 7-35, Kitashinagawa, 6-Chome, Shinagawa-Ku, Tokyo (JP)

( * ) Notice: Subject to any disclaimer, the term of this patent is extended or adjusted under 35 U.S.C. 154(b) by 19 days.

(21) Appl. No.: 09/859,641

(22) Filed: May 18, 2001

Related U.S. Application Data

(62) Division of application No. 09/370,225, filed on Aug. 9, 1999, now Pat. No. 6,280,292.

(30) Foreign Application Priority Data

Aug. 10, 1998 (JP) .......................... P10-226202

(51) Int. Cl.$^7$ ................................. B24B 9/60
(52) U.S. Cl. .................. 451/9; 451/5; 451/10; 451/8; 451/14
(58) Field of Search .................... 451/9, 5, 10, 8, 451/14

(56) References Cited

U.S. PATENT DOCUMENTS

| | | |
|---|---|---|
| 3,818,642 A | 6/1974 | Seidel |
| 4,481,742 A | 11/1984 | Shimizu et al. |
| 4,704,825 A | 11/1987 | Moore |
| 5,035,087 A | 7/1991 | Nishiguchi et al. |
| 5,427,564 A | 6/1995 | Whittington et al. |
| 6,077,148 A | 6/2000 | Klein et al. |
| 6,280,292 B1 * | 9/2001 | Sato et al. ................. 451/9 |

FOREIGN PATENT DOCUMENTS

| | | |
|---|---|---|
| JP | 10-29153 | 2/1998 |
| JP | 10-73420 | 3/1998 |

* cited by examiner

Primary Examiner—Joseph J. Hail, III
Assistant Examiner—Lee Wilson
(74) Attorney, Agent, or Firm—Ronald P. Kananen, Esq.; Rader, Fishman & Grauer PLLC

(57) ABSTRACT

A polishing wheel is pushed up and down in the Z-axis direction owing to a wafer surface shape. And the polishing amount depends on the height of protrusions on a wafer surface. Where a spindle is a rigid body in the Z-axis direction, the pressing force of the polishing wheel caused by vertical movement of a tool varies depending on the position on a wafer and hence polishing is not performed uniformly To solve this problem, the spindle is provided with a Z-axis parallel leaf spring mechanism. Push-up and push-down actions of the polishing wheel are absorbed by displacement of the parallel leaf spring mechanism. This enables uniform polishing. Since the tool can be hardened, the flatness can also be improved.

2 Claims, 28 Drawing Sheets

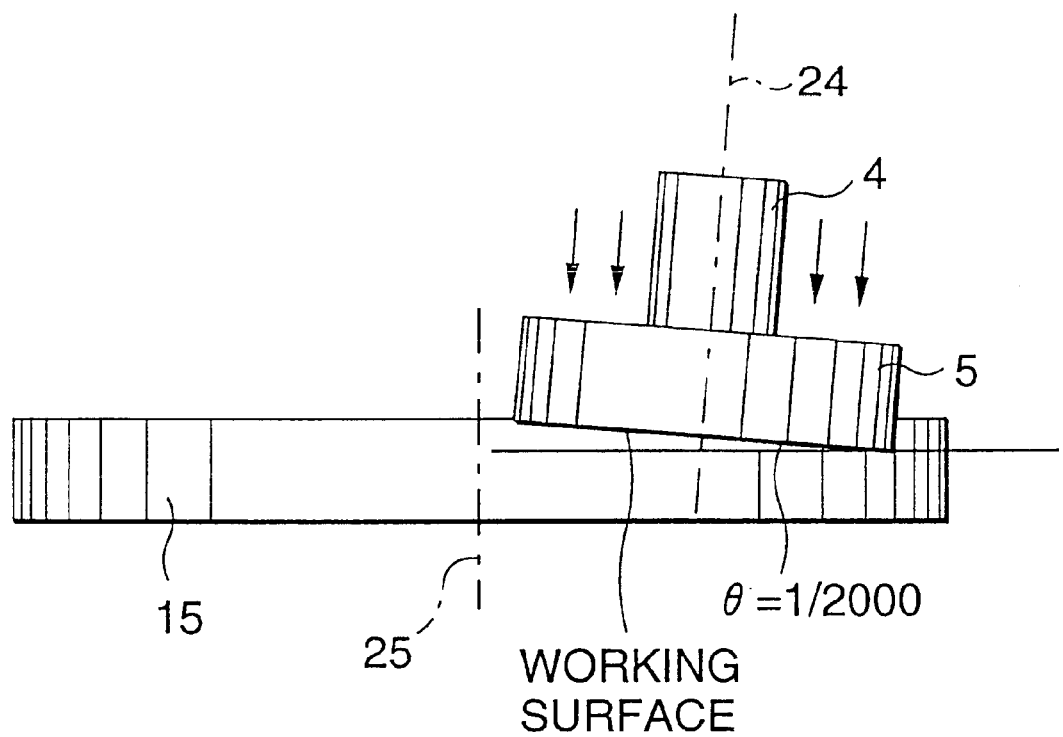

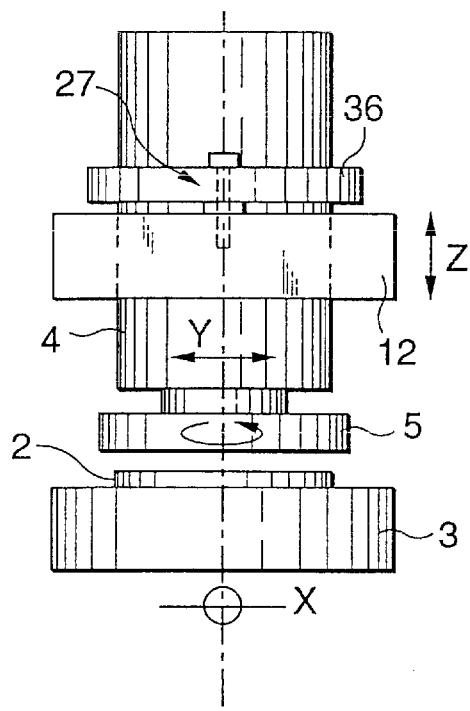 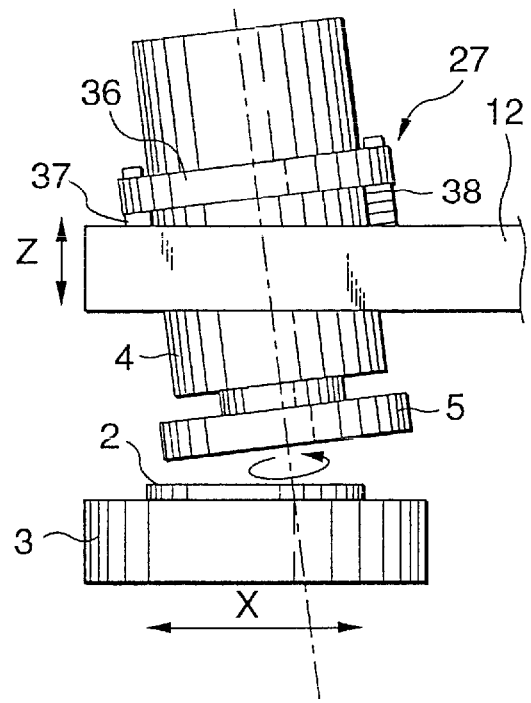
FIG.10(A)
FIG.10(B)

FIG.15(A)
FIG.15(B)
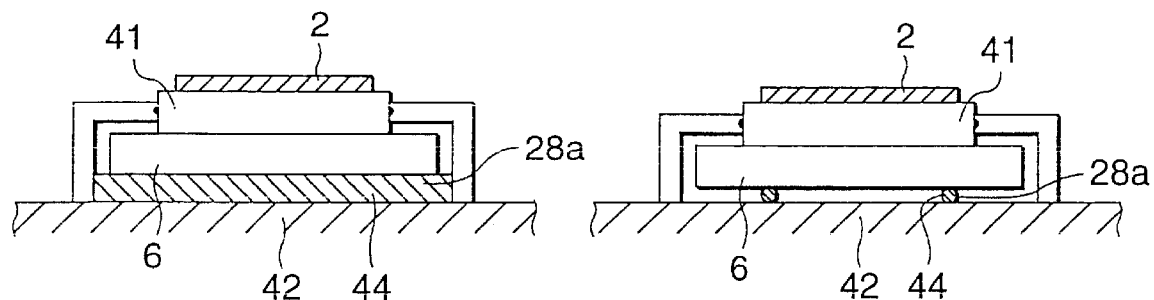
FIG.16
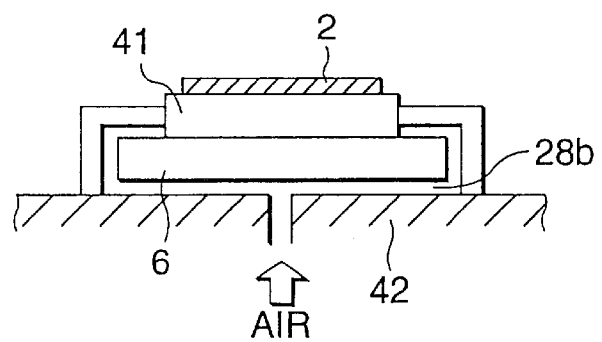

[BEFORE CORRECTION] 11.7%

[AFTER CORRECTION] 3.8%

(RADIAL POSITIONS OF MEASUREMENT POINTS ON WAFER)

POLISHING APPARATUS

This application is a div of 09/370,225 Aug. 9, 1999 now U.S. Pat. No. 6,280,292.

BACKGROUND OF THE INVENTION

1. Field of the Invention

The present invention relates to a polishing apparatus for polishing and finishing a thin-plate-like object such as a semiconductor wafer or a glass plate for an LCD so that its surface will be made flat and uniform in height.

2. Description of the Related Art

FIGS. 1 and 2 show conventional polishing apparatuses for polishing a thin-plate-like object such as a wafer. The polishing apparatus 1 shown in FIG. 1 is composed of a table 3 that supports a wafer 2 mounted thereon and can rotationally drive it, a polishing wheel 5 supported by a spindle 4, and other parts. The table 3 can be rotated in the horizontal plane by an X-axis slide 6 incorporating a rotational driving section as well as moved in the X-axis direction by an X-axis slide mechanism section 7.

The X-axis slide mechanism section 7 is composed of an X-axis ball-thread nut 8 that is fixed to the X-axis slide 6, an X-axis ball-thread screw 9 that is threadedly engaged with the X-axis ball-thread nut 8, an X-axis servo motor 10 for driving the X-axis ball screw 9, and other parts. On the other hand, the polishing wheel 5 is opposed to the table 3 and rotated in the horizontal plane. A Z-axis slide 12 is fixed to the spindle 4 and supported by a Z-axis guide so as to be slidable in the Z-axis direction.

With the above configuration, the wafer 2 that is mounted on the table 3 is polished by rotating the table 3 and the polishing wheel 5 while pressing the polishing wheel 5 against the wafer 2. The entire surface of the wafer 2 is polishing by moving the table 3 in the X-direction with the X-axis slide mechanism section 7.

On the other hand, in the polishing apparatus 1a shown in FIG. 2, a pad 15 is fixed to the top surface of a surface table (rotary table) 14 that is rotationally driven and a wafer 2 is absorbed and fixed on a polishing head 16 via an absorption film 17. The wafer 2 is polished by rotating it while pressing it against the pad 15 by means of a cylinder 18. To prevent scattering of an abrasive 20 or a polishing powder, the wafer 2 is enclosed by a retainer ring 19. A pad conditioner 21 for correcting roughening of the pad 15 is pressed against the pad 15. The wafer 2 is polished and finished by rotating the pad 15 together with the surface table 14 and rotating the wafer 2.

As shown in FIG. 3(A), the surface of a wafer 2 is not flat and is formed with many protrusions 22. To make the surface of the wafer 2 flat and uniform in height, it is necessary to flatten the protrusions 22. Conventionally, a static polishing/planarization method shown in FIG. 3(B) and a dynamic polishing/planarization method shown in FIG. 3(C) are employed as measures for removing the protrusions 22. In the former method, the protrusions 22 are removed by using a polishing pad 23 formed by bonding soft and hard pads together. In the latter method, the protrusions 22 are removed by adjusting the pressing force exerted on the protrusions 22 by utilizing the frequency characteristic of an elastic tool. The object of the polishing/planarization (CMP) is to flatten and uniformize the height of the surface of the wafer 2. In general, the flatness is represented by the difference A-B between height A of the highest point and height B of the lowest point of the protrusions 22 as measured from the base surface. On the other hand, the height uniformity is a percent value obtained by dividing dispersion of the polishing amount in the wafer 2 by an average polishing amount over the entire surface. As shown in FIG. 4, polishing/planarization is performed by removing the protrusions 22 while leaving large undulation of the entire surface of the wafer 2.

FIGS. 5(A)–5(D) show typical ones of various shapes of polishing subject surfaces of wafers 2. FIG. 5(A)–5(D) show a taper type, a sphere type, a chips type, and a twist type, respectively. Naturally, there are composite types of those.

To polish the surface of a wafer 2, a polishing wheel or the like is pressed against the surface of the wafer 2. In this case, uniform polishing can be attained more easily when the pressing force is constant.

When the surface of a wafer 2 is not flat as in the cases of FIGS. 5(A)–5(D), there occurs an action that the polishing is approximately in proportion to a push-up length or a push-down length.

The push-up length and the push-down length are relatively short in the cases of FIGS. 5(B)–5(D). On the other hand, in the case of FIG. 5(A) the push-up length in a central portion is much different from that in a peripheral portion. This causes a difference between the degree of removal of the protrusions 22 in the central portion of the wafer 2 and that in the peripheral portion. In this case, it is particularly difficult to obtain a polished surface that is flat and uniform in height.

On the other hand, as shown in FIG. 7, a deviation in parallelism exists between a polishing axis 24 and a pad axis 25 and there is a squareness deviation of about ½,000 in the circumferential direction. Therefore, a wafer 2 and a pad 15 do not contact each other uniformly, which is one factor of lowering the height uniformity in the surface of the wafer 2. Further, in this state, the flatness of the pad 15 is lowered faster and hence the pad 15 needs to be replaced more frequently.

For example, Japanese Unexamined Patent Publication Nos. Hei. 10-29153 and Hei. 10-73420 disclose polishing apparatuses for polishing a wafer to obtain a flat surface. In the publication No. Hei. 10-29153 entitled "Semiconductor Wafer Polishing Apparatus," an air room is provided behind a wafer holding plate for holding a semiconductor wafer and prescribed pressing force is applied to the wafer holding plate uniformly by controlling the inner pressure of the air room. In the publication No. Hei. 10-73420 entitled "Surface Shape Measuring Apparatus and Polishing Apparatus Using It," an object is polished in such a manner that its inclination is adjusted while its surface shape with respect to a reference glass plate is detected.

Although the above conventional techniques are effective for planarization of a wafer, the former technique is macroscopic and cannot obtain a sufficient level of flatness for a wafer having protrusions of different heights at many locations. Although the latter technique employs a piezoelectric element as a surface adjusting means, it cannot obtain a sufficient level of flatness for a wafer having a surface shape as shown in FIG. 5(A). Further, since the adjusting means of this technique is not so specific and close as that of the invention as described in this specification, this technique cannot provide sufficient levels of flatness and height uniformity.

SUMMARY OF THE INVENTION

The present invention has been made in view of the above circumstances in the art, and an object of the invention is therefore to improve both of the flatness of a thin-plate-like object and its height uniformity that is in tradeoff relationship with the flatness, enable cost reduction through increase of the polishing efficiency, dispense with a dummy pattern (an extra wiring incorporated at the time of designing to compensate for flatness defects) or the like, enable improvement of device characteristics, increase of margins and freedom in designing, etc., and elongate the life of a pad.

To attain the above object, the invention provides a polishing apparatus for polishing and finishing a thin-plate-like object so that the object is made flat and uniform in height by pressing the object being in contact with a surface of a table that is provided parallel with a horizontal surface by means of a polishing wheel that is opposed to the object, comprising a displacing mechanism section for displacing a support side of the polishing wheel or the object in accordance with working pressure; or a rotation speed correction mechanism section for varying a relative rotation speed between the polishing wheel and the object in accordance with the working pressure.

According to another aspect of the invention, there is provided a polishing apparatus in which a pad is stuck to a rotary table that is provided parallel with a horizontal surface, an object that is opposed to the pad is pressed against a pad side while rotating the object, and a pad conditioner is provided that is in contact with the pad, comprising detecting means provided on an object side and a pad conditioner side, for detecting a displacement of the pad in a Z-direction; and swing units for adjusting inclination angles from a Z-axis on the object side and the pad conditioner side based on detection signals that are output from the detecting means, respectively.

The object side or the side of the polishing wheel for polishing the object is displaced through action of the displacing mechanism section or the rotation speed correction mechanism section that operates in accordance with the working pressure that varies in accordance with protrusions of the object, to uniformize the working pressure. Since the working pressure is uniformized, the height uniformity of the object is improved. This makes it possible to harden the polishing wheel side, thereby improving the flatness.

By adjusting the inclination angle of the polishing wheel side with respect to the object, the object and the polishing side can be made parallel with each other, making it possible to improve the flatness and the height uniformity.

Because of its relatively simple configuration, the polishing apparatus of the invention can be implemented at a relatively low cost. Further, since high-speed polishing is enabled, the productivity can be increased.

BRIEF DESCRIPTION OF THE DRAWINGS

FIG. 7 schematically shows a deviation in parallelism between the axes of a pad and a polishing wheel;

FIGS. 10(A) and 10(B) are front and side views, respectively, showing a spindle slide mechanism of a polishing apparatus according to the invention;

FIGS. 15(A) and 15(B) are sectional views showing another table damper mechanism of a polishing apparatus according to the invention;

FIG. 16 is a sectional view showing a further table damper mechanism of a polishing apparatus according to the invention;

DETAILED DESCRIPTION OF THE PREFERRED EMBODIMENTS

Figure 1:
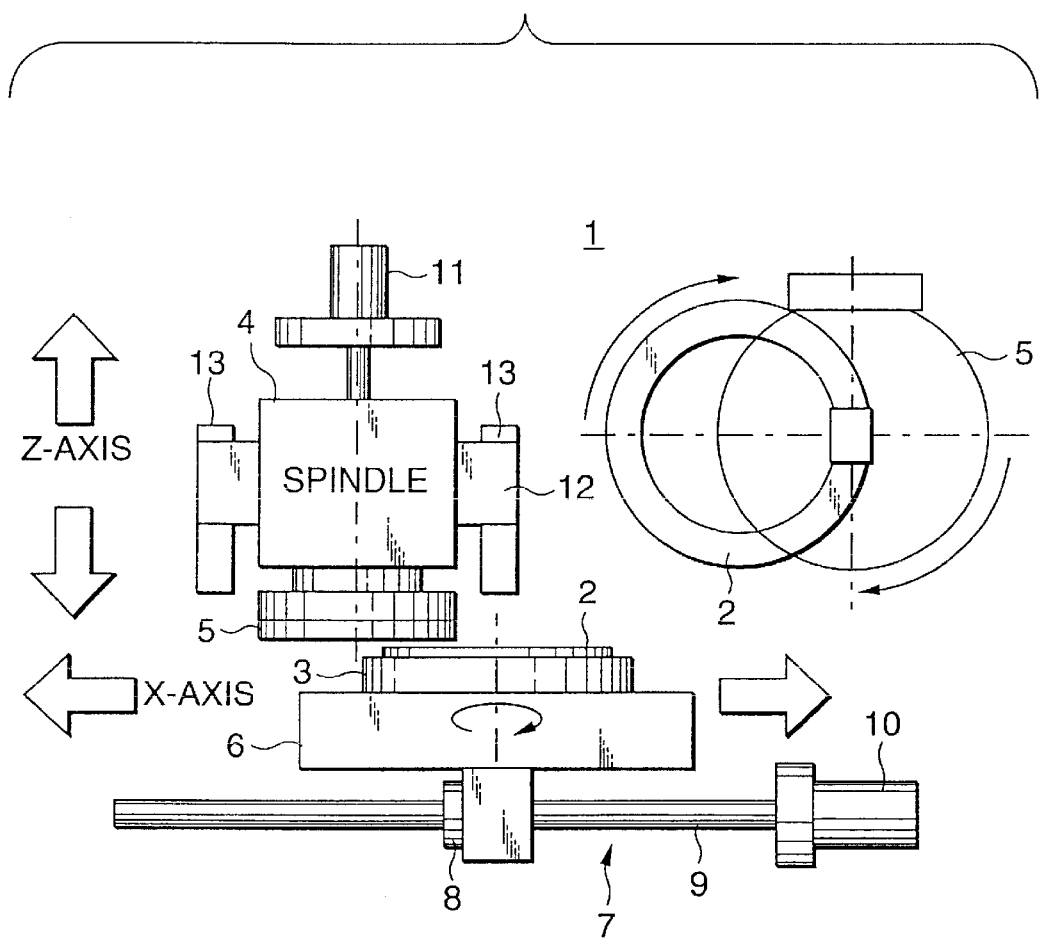
FIG. 1 is a front view outlining the configuration of a conventional polishing apparatus.
Figure 3A:
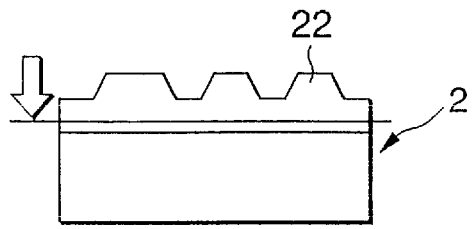
FIGS. 3(A)–3(C) schematically show a surface shape of a wafer and methods for polishing it.
Figure 5A:
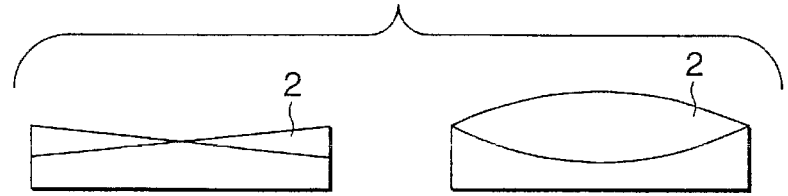
FIGS. 5(A)–5(D) are front views and side views showing various surface shapes of wafers.
Figure 5B:
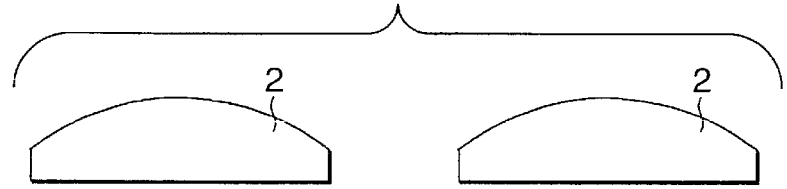
Figure 5C:
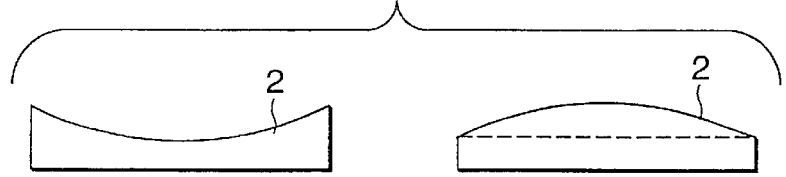
Figure 5D:
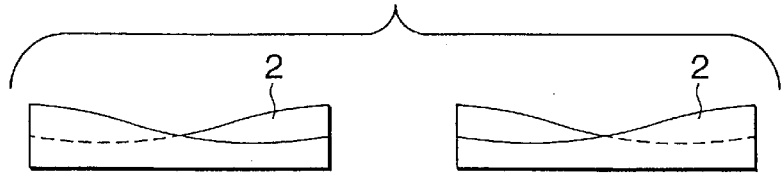
Figure 6:
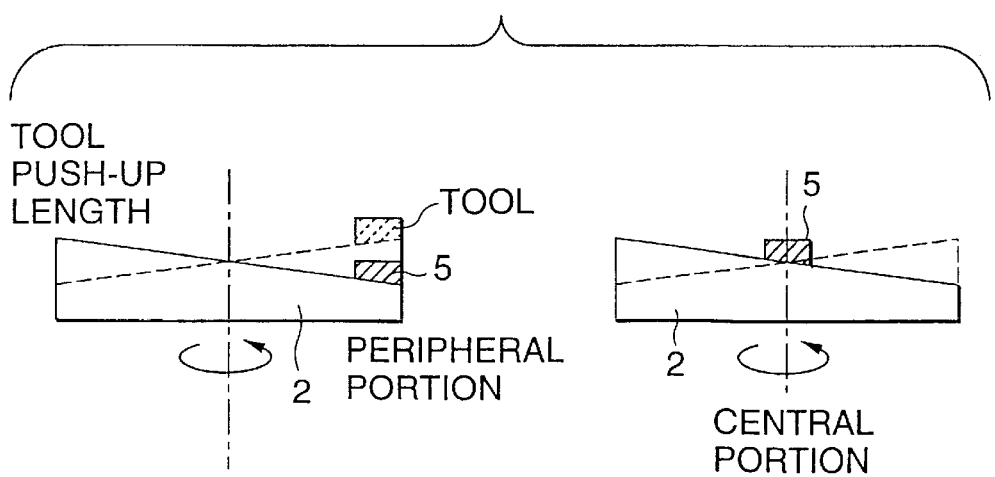
FIG. 6 is a front view and a side view showing how a tool is pushed up in a wafer having a slant surface.

Embodiments of a polishing apparatus according to the present invention will be hereinafter described in detail with reference to the accompanying drawings. First, a description will be made of height uniformization and planarization of a wafer 2 in the polishing apparatus shown in FIG. 1. As described above, the polishing subject surface of the wafer 2 has inclinations and protrusions 22 (see FIG. 3(A)) and hence the working pressure varies as the polishing proceeds. In the case of the wafer 2 shown in FIG. 5(A), because of a large push-up length etc. the protrusions 22 are not polished uniformly. It is necessary to vary the height of the polishing wheel 5 in accordance with the push-up length, and various displacing mechanism sections are employed for this purpose.

Figures 8A, 8B:
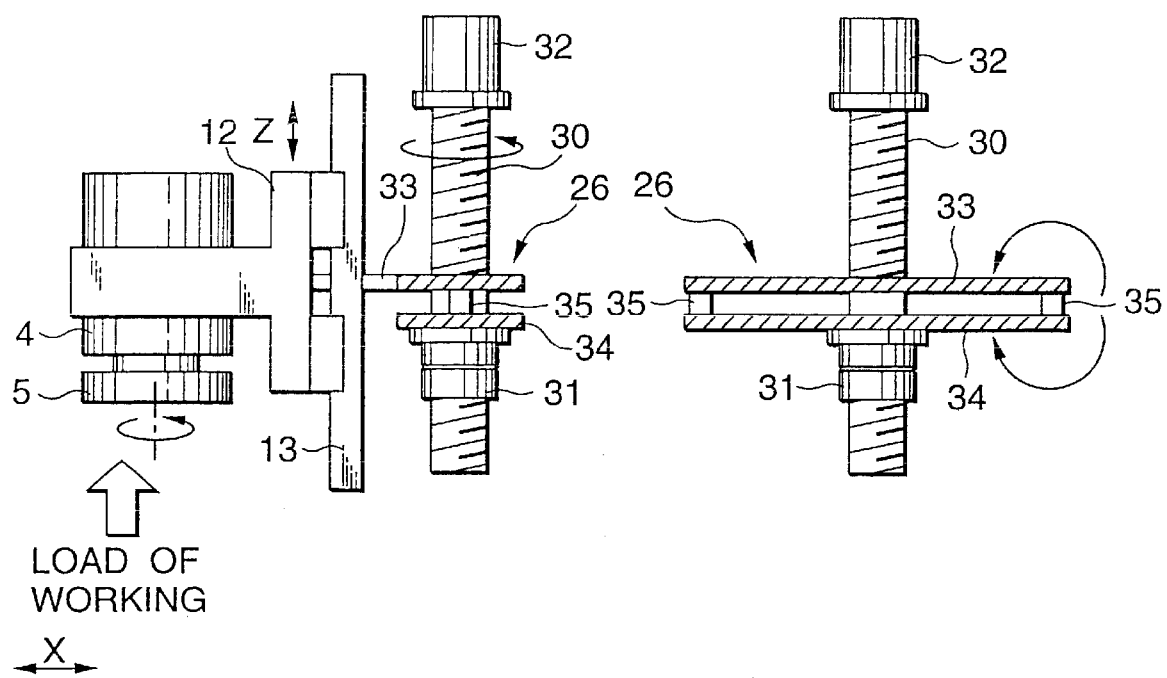
FIGS. 8(A) and 8(B) are partial front and side views, respectively, showing a Z-axis parallel leaf spring mechanism of a polishing apparatus according to the present invention.

Specific embodiments of the displacing mechanism section according to the invention will be described below, which are a Z-axis parallel leaf spring mechanism 26 shown in FIGS. 8(A) and 8(B) etc., spindle slide mechanism 27 shown in FIGS. 10(A) and 10(B) etc., a table damper mechanism shown in FIG. 14 etc., and a tilting table mechanism 29 shown in FIG. 18 etc.

First, the Z-axis parallel leaf spring mechanism 26 will be described. As shown in FIGS. 8(A) and 8(B), the spindle 4 of a polishing wheel 5 is supported by a Z-axis slide 12, which is supported by a Z-axis guide 13 so as to be slidable in the Z-axis direction along the Z-axis guide 13. A Z-axis ball-thread screw 30 is provided in the vicinity of the Z-axis guide 13, and a ball-thread nut 31 is threadedly engaged with the Z-axis ball-thread screw 30. The Z-axis ball-thread screw 30 is driven by a Z-axis servo motor 32.

The Z-axis parallel leaf spring mechanism 26 of the invention is composed of parallel leaf springs 33 and 34 that are suspended between the Z-axis guide 13 and the Z-axis ball-thread screw 30, props 35 that are interposed between the parallel leaf springs 33 and 34, and other parts. Specifically, the parallel leaf spring 34 is fixed to the ball-thread nut 31 and the parallel leaf spring 33 is fixed to the Z-axis guide 13. Displacement in the Z-axis direction of the polishing wheel 5 is absorbed by bends of the parallel leaf springs 33 and 34 that are supported by the props 35. The stiffness of the Z-axis parallel leaf spring mechanism 26 can easily be changed by changing the length of the props 35. For example, the props 35 are shortened to increase the stiffness value (i.e., to make the mechanism 26 stiffer) and elongated to decrease the stiffness value (i.e., to make the mechanism 26 weaker).

Figure 9:
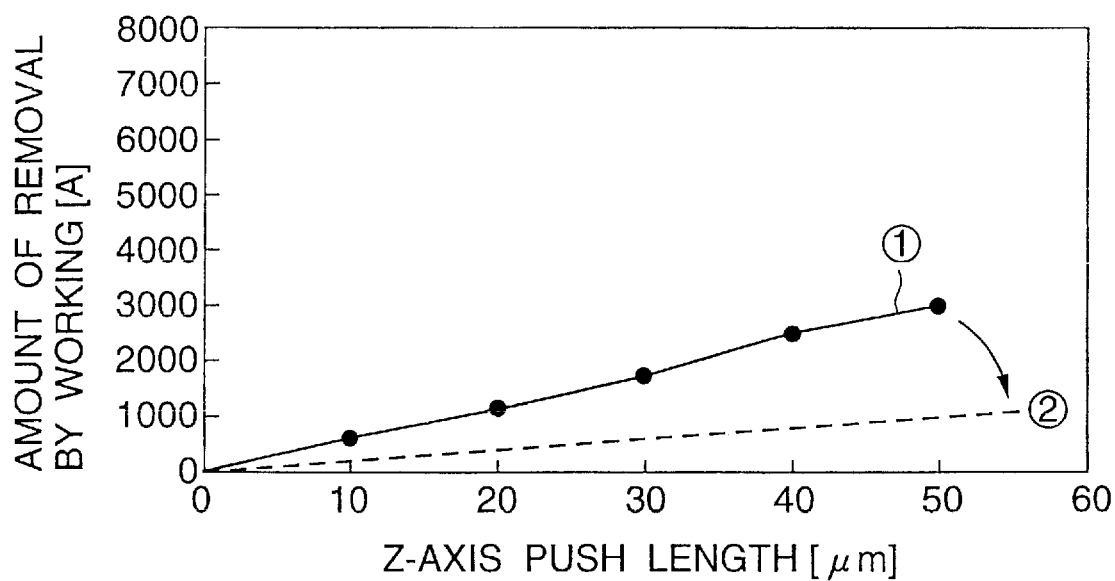
FIG. 9 is a graph showing a relationship between the Z-axis push length and the amount of removal by working.

As shown in FIG. 9, the Z-axis push length ($\mu$m; horizontal axis) is in proportion to the amount of removal by polishing (Å; vertical axis). Straight line ① corresponds to a case where the Z-axis parallel leaf spring mechanism 26 is not used. Straight line ②, which corresponds to a case where the mechanism 26 is used, has a gentler slope than straight line ①. That is, by constructing the Z-axis parallel leaf spring mechanism 26 so that its stiffness in the Z-axis direction follows straight line ②, the protrusions 22 can be polished while the push-up length depending on the surface shape of the wafer 2 is absorbed, whereby the uniformity of polishing can be improved.

Figure 11A:
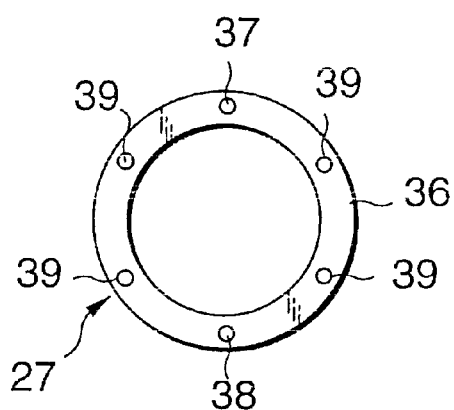
FIGS. 11(A) is a plan view showing an arrangement of coil springs interposed between a flange of a spindle and a Z-axis slide of the spindle slide mechanism of FIGS. 10(A) and 10(B)
Figure 11B:
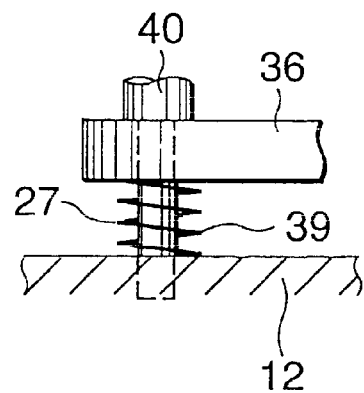
FIG. 11(B) is a partial enlarged view showing a detailed structure of each coil spring shown in FIG. 10(A) and its vicinity.

FIGS. 10(A) and 10(B) show a spindle slide mechanism 27. In this embodiment, shims 37 and 38 are interposed between a flange 36 of a spindle 4 and a Z-axis slide 12, whereby the spindle 4 is inclined in the X-axis direction as shown in FIG. 10(B). Further, as shown in FIGS. 11(A) and 11(B), coil springs 39 are interposed between the flange 36 and the Z-axis slide 12. The coil springs 39 may be omitted. As shown in FIG. 10(B), the shim 37 is taller than the shim 38 and hence the spindle 4 is inclined in such a manner that its left-hand side in the X-direction (see FIG. 10(B)) is lower than its right-hand side. In this manner, the spindle 4 is fixed in the X-direction.

On the other hand, as shown in FIG. 11(A), a plurality of coil springs 39 are provided at regular intervals on the flange 36 of the spindle 4. The coil springs 39 are guided by respective rods 40. With the above structures, the spindle 4 is fixedly supported in the X-direction and elastically supported in the Y-direction. If the coil springs 39 are not provided, the spindle 4 is rendered free in the Y-direction. As a specific example, where the TTV (thickness dispersion) of the wafer 2 is about 5 $\mu$m, the inclination shown in FIG. 10(B) is set at 20–200 $\mu$m.

Figure 12A:
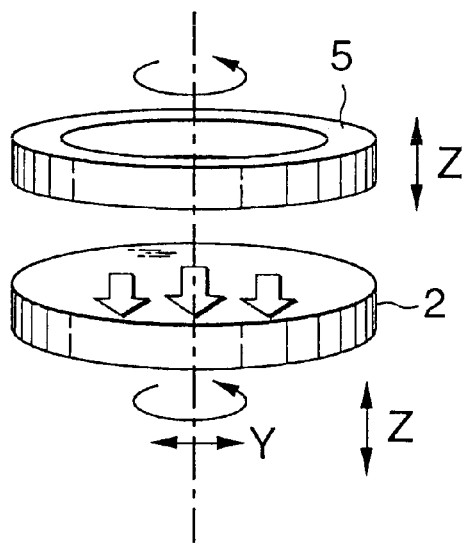
FIGS. 12(A) and 12(B) are front and side views, respectively, showing an engagement state between a wafer and a polishing wheel provided with the spindle slide mechanism of FIGS. 10(A) and 10(B)
Figure 12B:
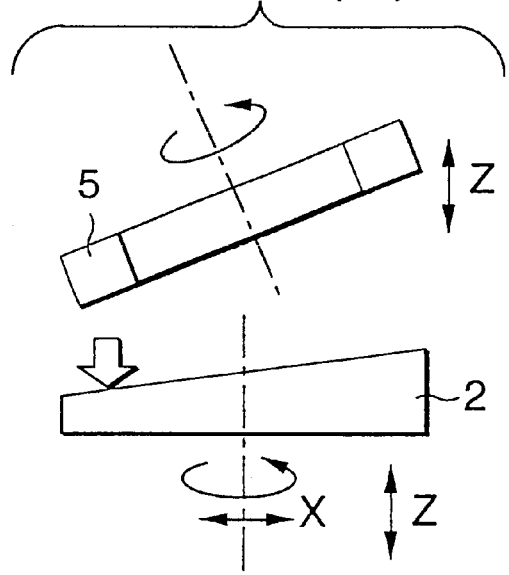
Figure 13A:
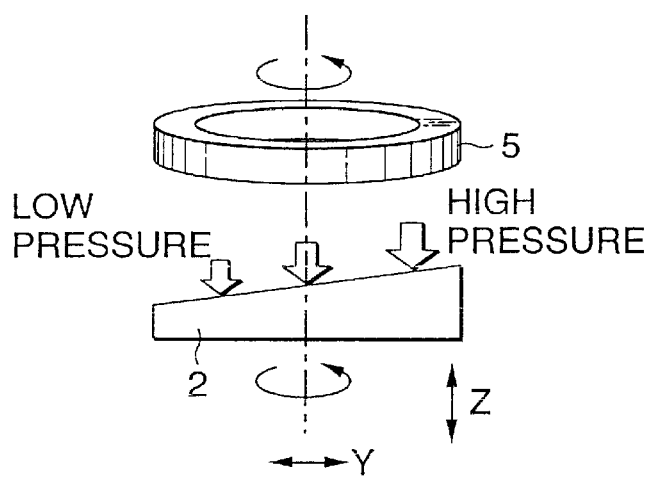
FIGS. 13(A) and 13(B) are side and front views, respectively, showing an engagement state between a wafer and the polishing wheel provided with the spindle slide mechanism of FIGS. 10(A) and 10(B)
Figure 13B:
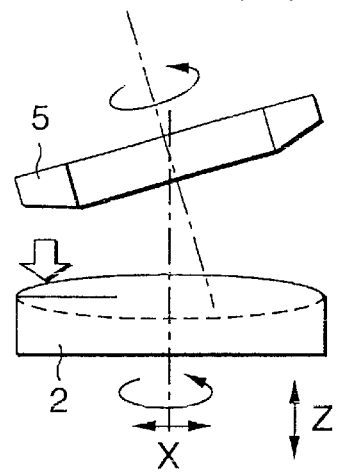

When the surface of the wafer 2 is inclined in the X-axis direction as shown in FIGS. 12(A) and 12(B), a push-up length in the Z-axis direction can be absorbed even by the above-described Z-axis parallel leaf spring mechanism 26, that is, even without using the spindle slide mechanism 27 of this embodiment. When the surface of the wafer 2 is inclined in the Y-axis direction as shown in FIGS. 13(A) and 13(B), the use of the spindle slide mechanism 27 of this embodiment allows the spindle 4 to be supported freely or elastically in the Y-axis direction. As a result, not influenced by the inclination of the surface of the wafer 2, the polishing apparatus can perform uniform polishing.

Figure 14:
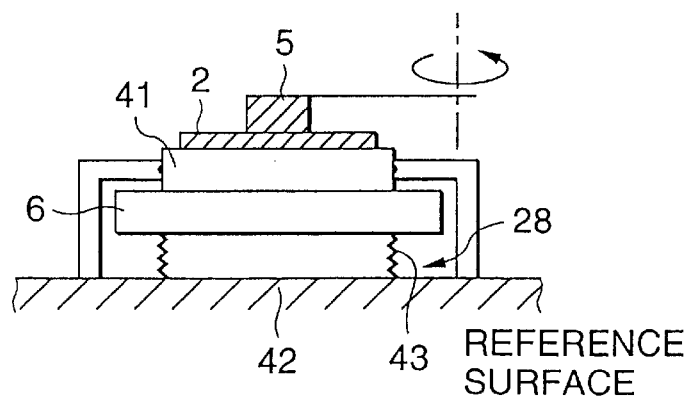
FIG. 14 is a sectional view showing a table damper mechanism of a polishing apparatus according to the invention.

FIGS. 14–16 show table damper mechanisms 28, 28a, and 28b. This type of mechanism is applied to a structure in which a wafer 2 is absorbed on and supported by a wafer chuck 41 made of highly rigid ceramics or the like. The wafer 2 is polished in such a manner that a polishing wheel 5 is rotated and moved in the X-direction, for example, while being pressed against the top surface of the wafer 2. Springs 43 as the table damper mechanism 28 are interposed between the bottom surface of the wafer chuck 41 and a reference surface 42. The push-up length can be absorbed by the above-described structure. Having a small plastic deformation amount, the springs 43 can generate working pressure that is approximately in proportion to the deformation amount of the springs 43 that depends on the push length in the Z-direction. The working amount can thus be controlled correctly.

In the table damper mechanism 28a of FIGS. 15(A) and 15(B), a rubber member 44 is used instead of the above springs 43. Being an elasto-plastic body, rubber has a feature that it generates constant pressure irrespective of its deformation amount when used under such pressure as to be deformed more than a certain limit. To utilize this phenomenon, the wafer chuck 41 is supported via the rubber member 44 that is pre-pressed to a certain extent. The polishing apparatus of this embodiment has a feature that if the rubber member 44 is pressed in the Z-axis direction by more than a certain length, no pressure difference is generated even when displacement due to wafer thickness dispersion occurs and hence a constant working amount can be obtained.

The rubber member 44 is made of NBR, silicone rubber, urethane rubber, or the like. As for the shape of the rubber member 44, it may be a solid member (see FIG. 15(A)), an O-ring (see FIG. 15(B)), a ring-like sheet (not shown), a perforated sheet (not shown), divided sheets (now shown), etc. The stiffness (i.e., the pressing force vs. displacement characteristic) can be adjusted to an arbitrary value also in consideration of the thickness.

The table damper mechanism 28b of FIG. 16 is of such a type as to be supported by air pressure of a chuck. Having no dispersion relating to the materials of parts, this type of table damper mechanism makes it possible to easily manufacture and duplicate polishing apparatuses that behave in a manner as designed. Since the working amount is determined by the air pressure irrespective of the push length in the Z-direction, this type of table damper mechanism enables complete constant-pressure working.

Figure 17:
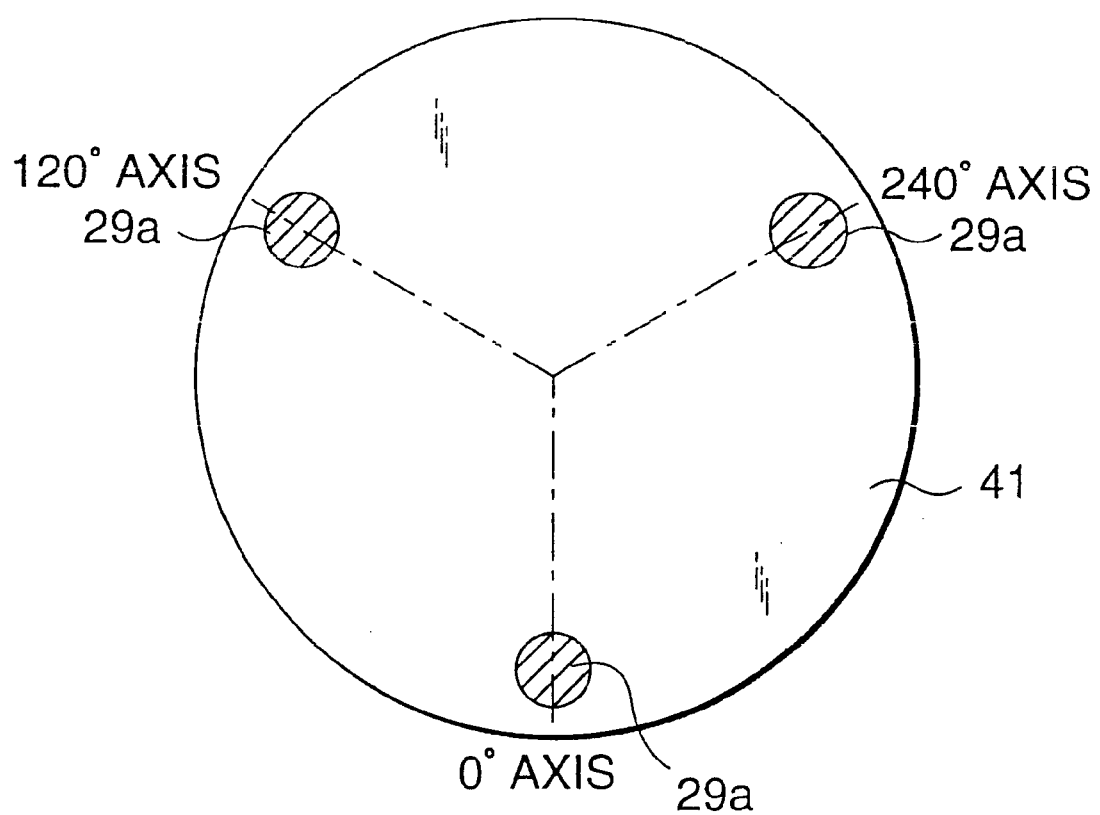
FIG. 17 is a plan view showing an arrangement of actuators of a tilting table mechanism of a polishing apparatus according to the invention.
Figure 18:
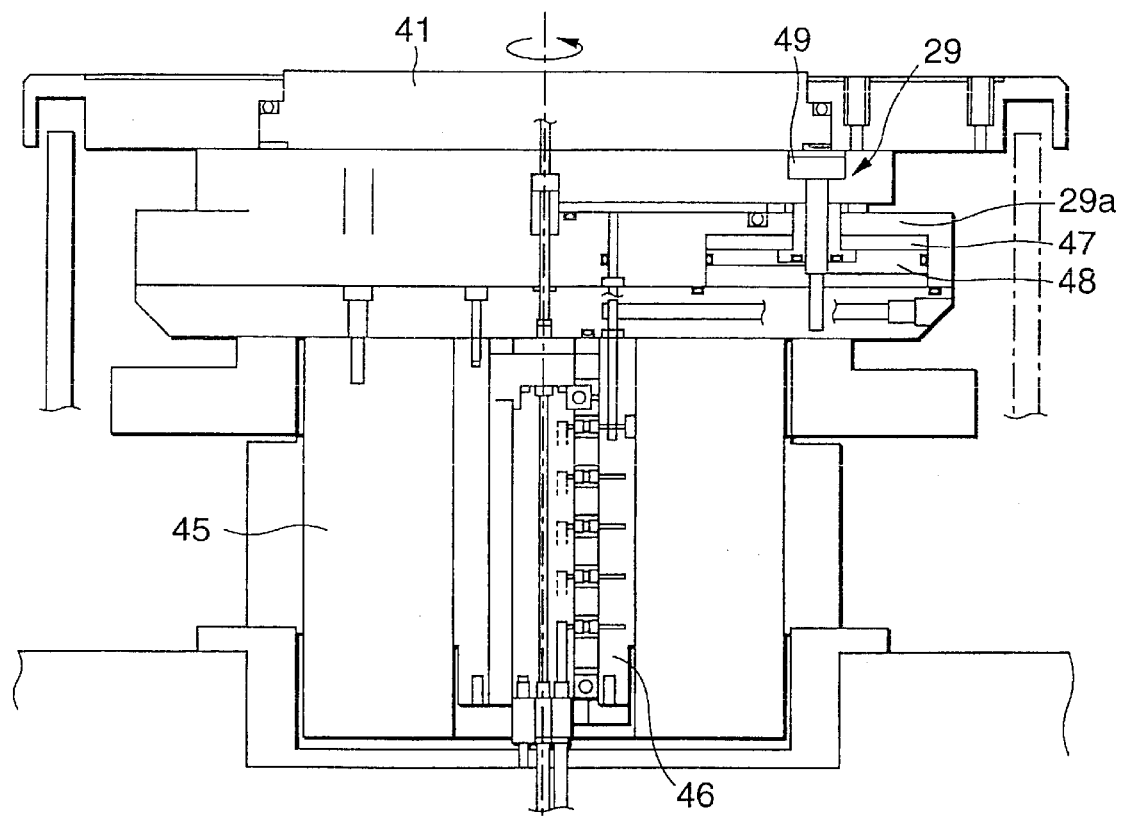
FIG. 18 is a sectional view taken so as to include the axis and shows a detailed structure of the tilting table mechanism of the polishing apparatus of the invention.

FIGS. 17, 18, etc. show a tilting table mechanism 29. In this mechanism, a rotation torque signal of the spindle 4 is detected and the amount of removal by working is uniformized by making corrections to obtain constant torque, that is, by decreasing the height of a wafer chuck 41 that absorbs and supports a wafer 2 at a portion where the torque would otherwise be large and increasing the height of the wafer chuck 41 at a portion where the torque would otherwise be small. As shown in FIG. 17; this mechanism has actuators 29a that are provided at a plurality of positions (three positions in FIG. 17) that equally divide a circle that is concentric with the circumference of the wafer chuck 41.

As shown in FIG. 18, the wafer chuck 41 that absorbs and supports a wafer 2 (not shown) is supported by an X-axis slide 6 (see FIG. 1) via a table shaft 45. A rotary joint 46, which is provided inside the table shaft 45, supplies pressure oil to a tilting table mechanism 29 that is provided inside the wafer chuck 41.

Each actuator 29a of the tilting table mechanism 29 is composed of a cylinder 47, a piston 48, a bolt 49 that is fixed to the piston 48 and the wafer chuck 41, and other parts. Pressure that is supplied to the cylinder 47 moves the piston 48 and displaces the bolt 49 in the axial direction. This axial displacement varies the height of the top surface of the wafer chuck 41. The pressure that is supplied to the cylinder 47 is controlled by external electropneumatic regulators via the rotary joint 46.

Figure 19:
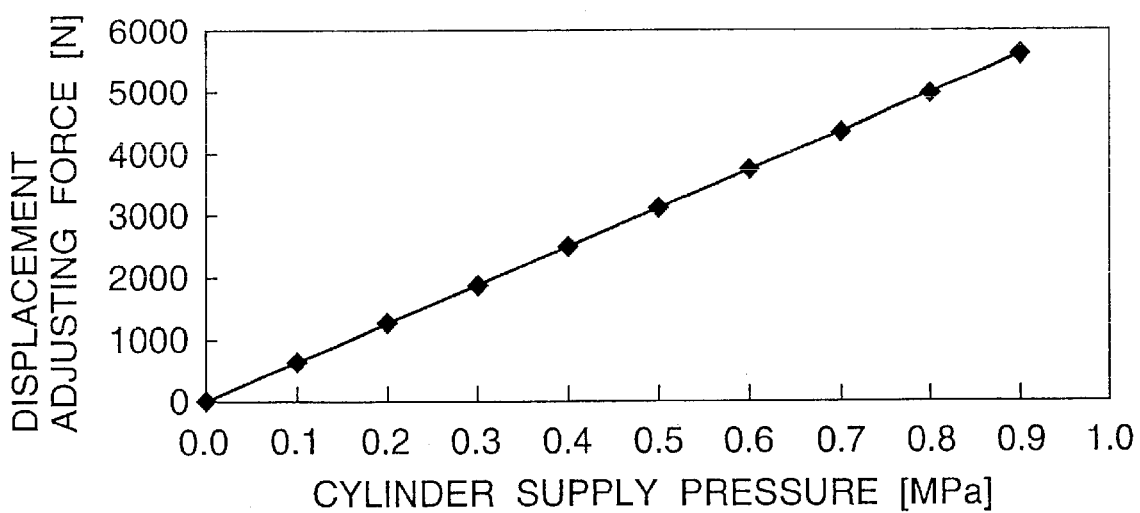
FIG. 19 is a graph showing a relationship between the cylinder supply pressure and the displacement adjusting force in the tilting table mechanism.
Figure 20:
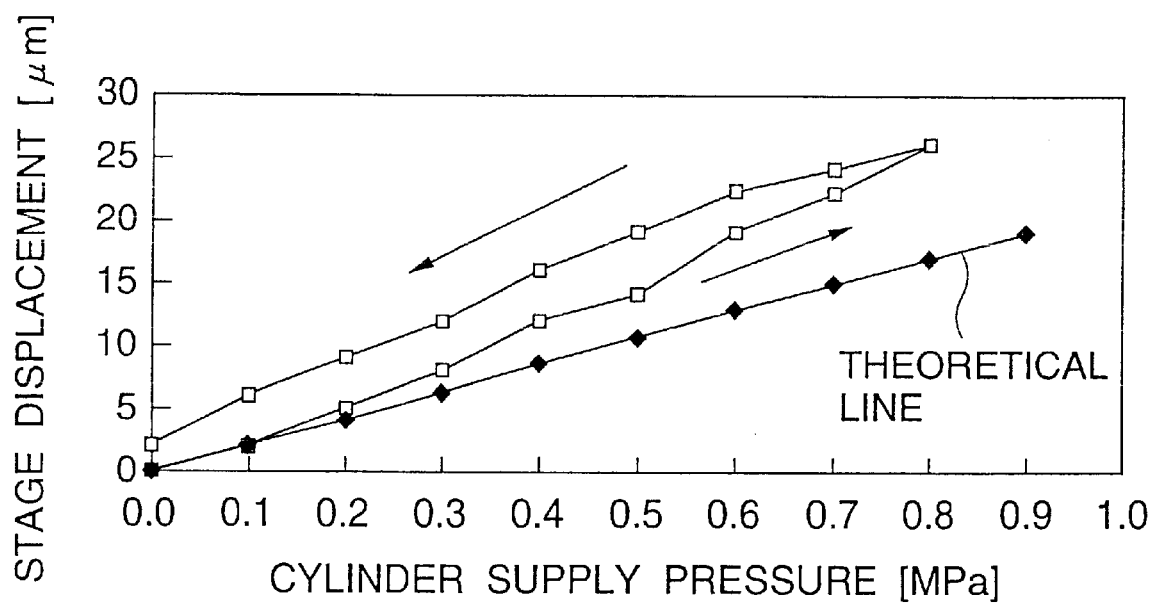
FIG. 20 is a graph showing a relationship between the cylinder supply pressure and the stage displacement in the tilting table mechanism.

FIG. 19 shows a relationship between the cylinder supply pressure and the displacement adjusting force. Displacement adjusting force corresponding to a pressure of 0.1 MPa is about 1,000 N, which is considerably strong. Therefore, the wafer chuck 41 is not displaced when a working load of about 500 N is applied to it. FIG. 20 shows a relationship between the cylinder supply pressure and the displacement of the stage (surface) of the wafer chuck 41.

Figure 21:
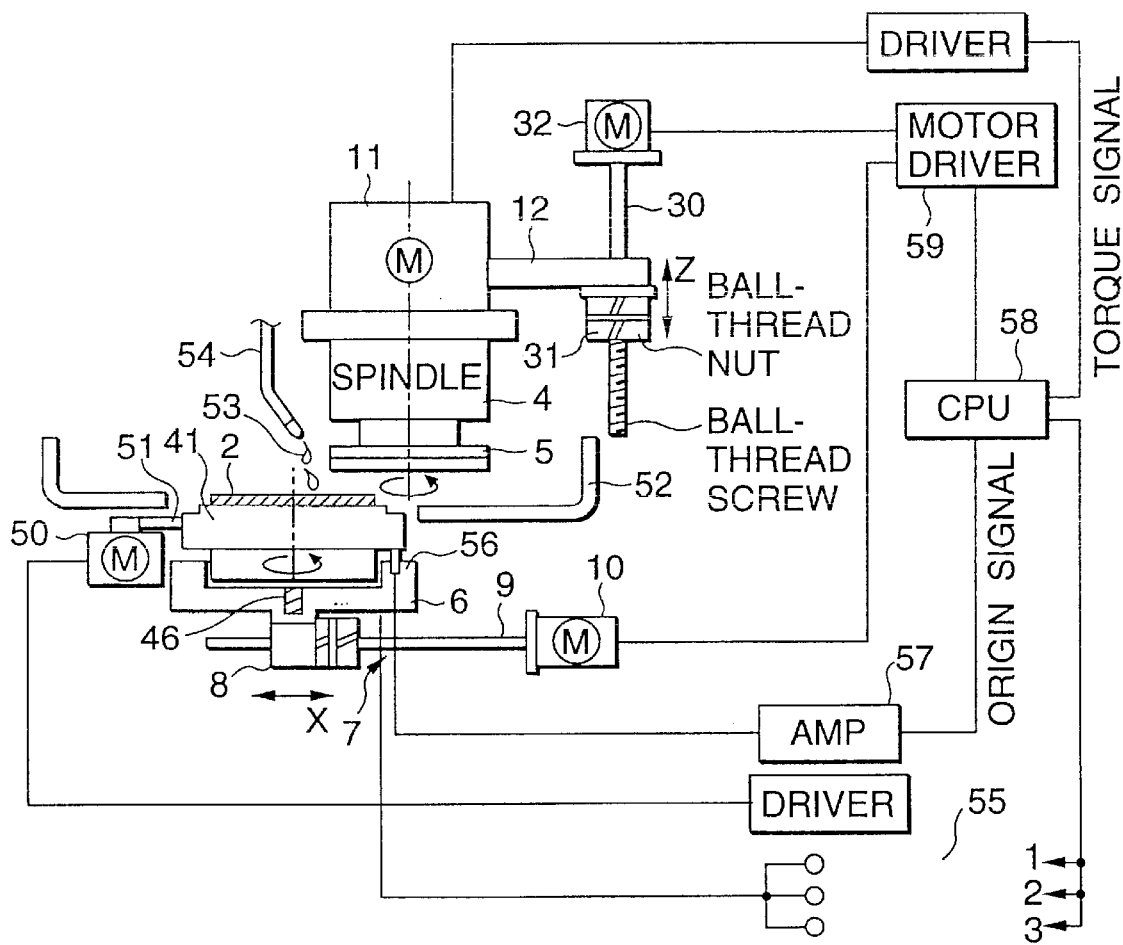
FIG. 21 shows the configurations of control and detection systems in a polishing apparatus having the tilting table mechanism.
Figure 22:
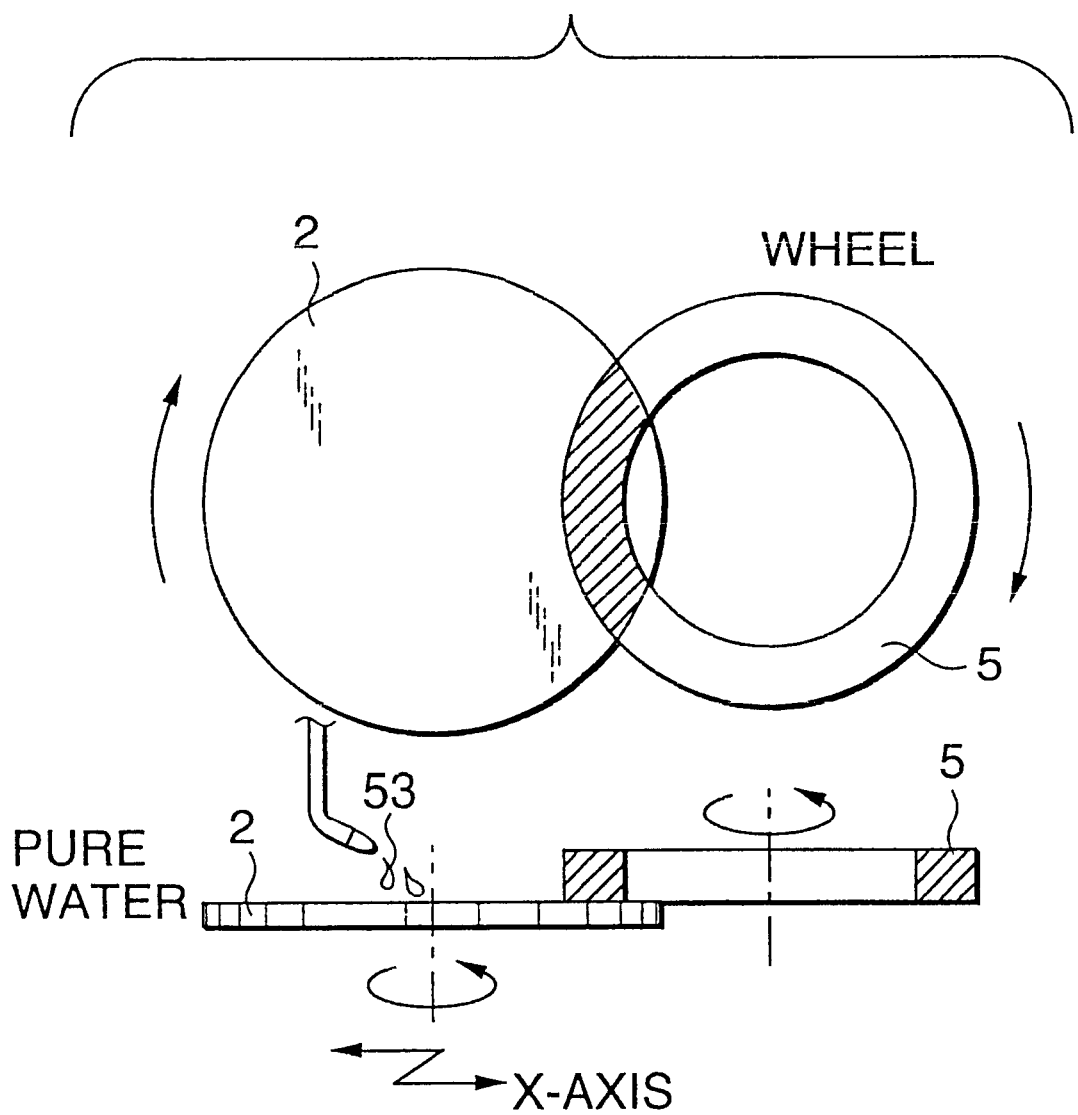
FIG. 22 are a plan view and a side view showing an engagement state between a polishing wheel and a wafer in the polishing apparatus having the tilting table mechanism.

FIG. 21 shows the entire configuration of a polishing apparatus having the actuators 29a of the tilting table mechanism 29 of this embodiment and its control and detection systems. As described above, the wafer chuck 41 having the actuators 29a is rotated by a table shaft motor 50 via a belt 51 and moved in the X-axis direction via the X-axis slide 6. Slurry or pure water 53 is supplied to a wafer 2 that is absorbed on and supported by the wafer chuck 41 by means of a jetting nozzle 54 or the like. As shown in FIG. 22, the wafer 2 is polished by rotation and pressing of a polishing wheel 5. A working pan 52 is provided around the wafer chuck 41 to prevent scattering of polishing powder, slurry, or pure water.

An X-axis servo motor 10 and a Z-axis servo motor 32 are connected to a CPU 58 via a motor driver 59 and controlled by the CPU 58. The rotary joint 46 is connected to electropneumatic regulators 55, which are controlled by the CPU 58. In this embodiment, there are three electropneumatic regulator 55, that is, electropneumatic regulator-1, -2, and -3 that control the actuators 29a of the tilting table mechanism 29 that are arranged on the 0° axis, 120° axis, and 240° axis, respectively.

Figure 23:
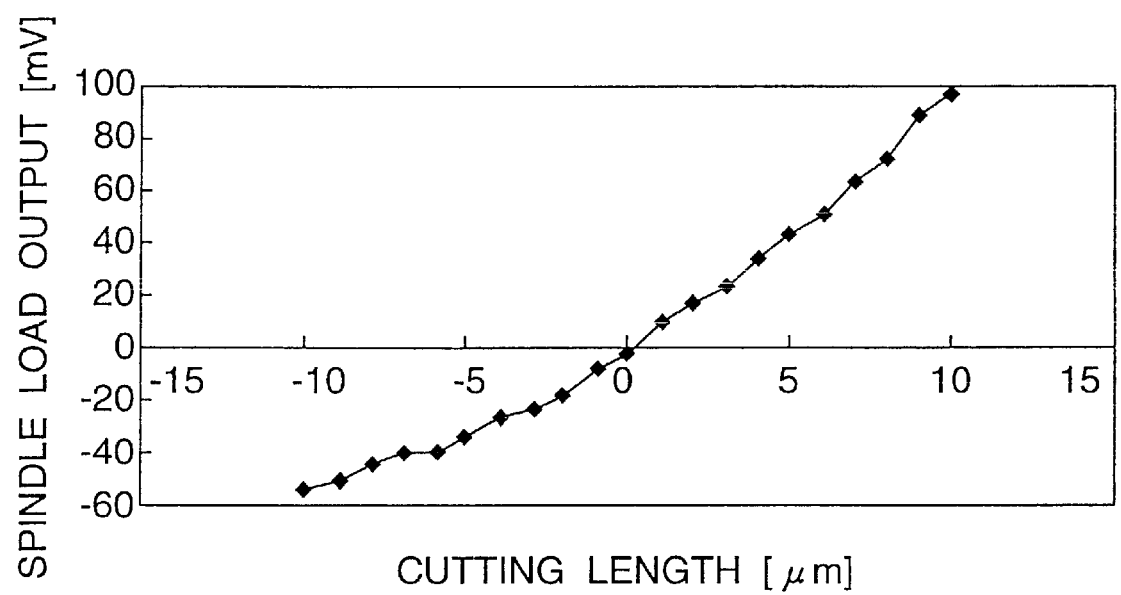
FIG. 23 is a graph showing a relationship between the cutting length and the spindle load output of the polishing apparatus having the tilting table mechanism.

An origin sensor 56, which is provided on the X-axis slide 6, detects the origin of the wafer chuck 41. The spindle 4 is rotationally driven by a spindle torque motor 11, and the spindle load is detected by the CPU 58 based on a torque signal that is output from the spindle torque motor 11. FIG. 23 shows a relationship between the cutting length ($\mu$m) and the spindle load output (mV). It is seen that the relationship is approximately linear.

Figure 25:
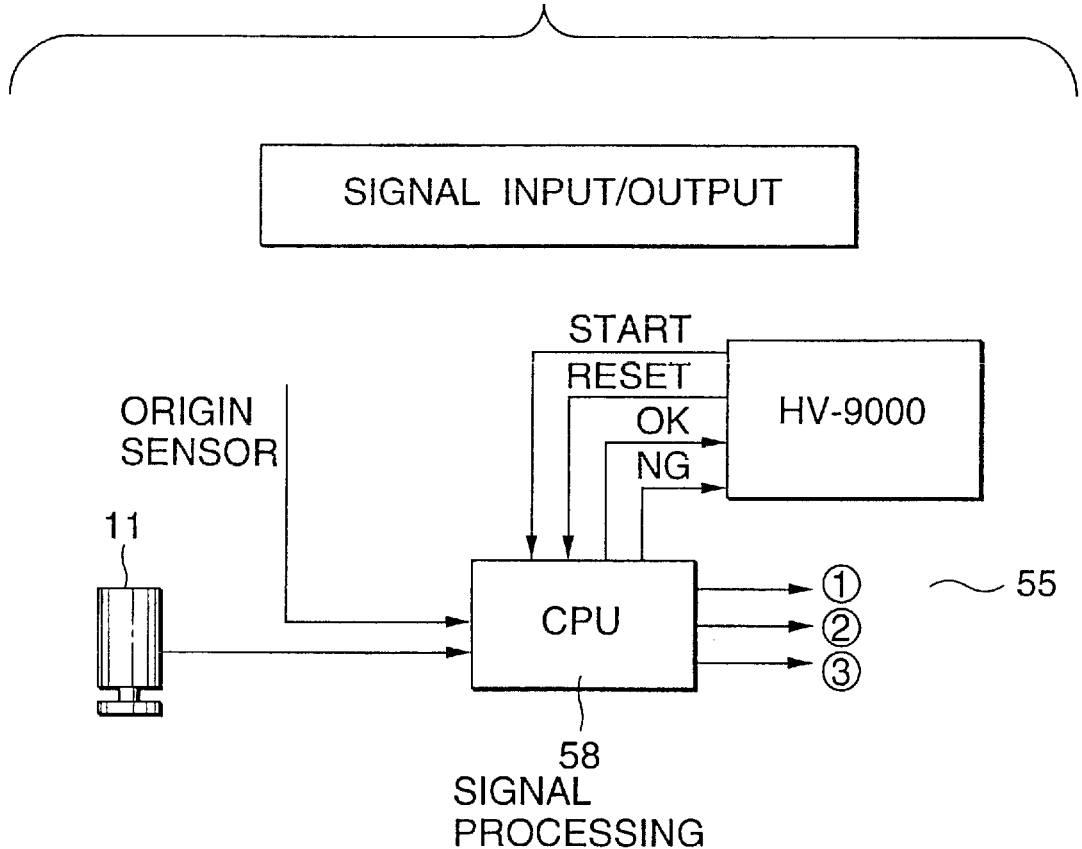
FIG. 25 is a schematic circuit diagram showing a signal processing method in the polishing apparatus having the tilting table mechanism.

The point where the polishing wheel 5 that is descending contacts the surface of the wafer 2 is made a zero point of working. In practice, a spindle load output signal voltage is set at the beginning in a state that the polishing wheel is located at the lower limit point of a range where the wafer 2 is not worked, and thereafter a point where the spindle load output signal voltage is reached is employed as a zero point of working. Phase height signals of the actuators 29a that adjust the wafer chuck 41 are determined by averaging a spindle load output sampling signal over the hatched regions having the 0° axis, 120° axis, and 240° axis of the wafer chuck 41 as the center lines. FIG. 25 is a signal input/output diagram showing signal processing that is performed by the polishing apparatus of FIG. 21.

Figure 24:
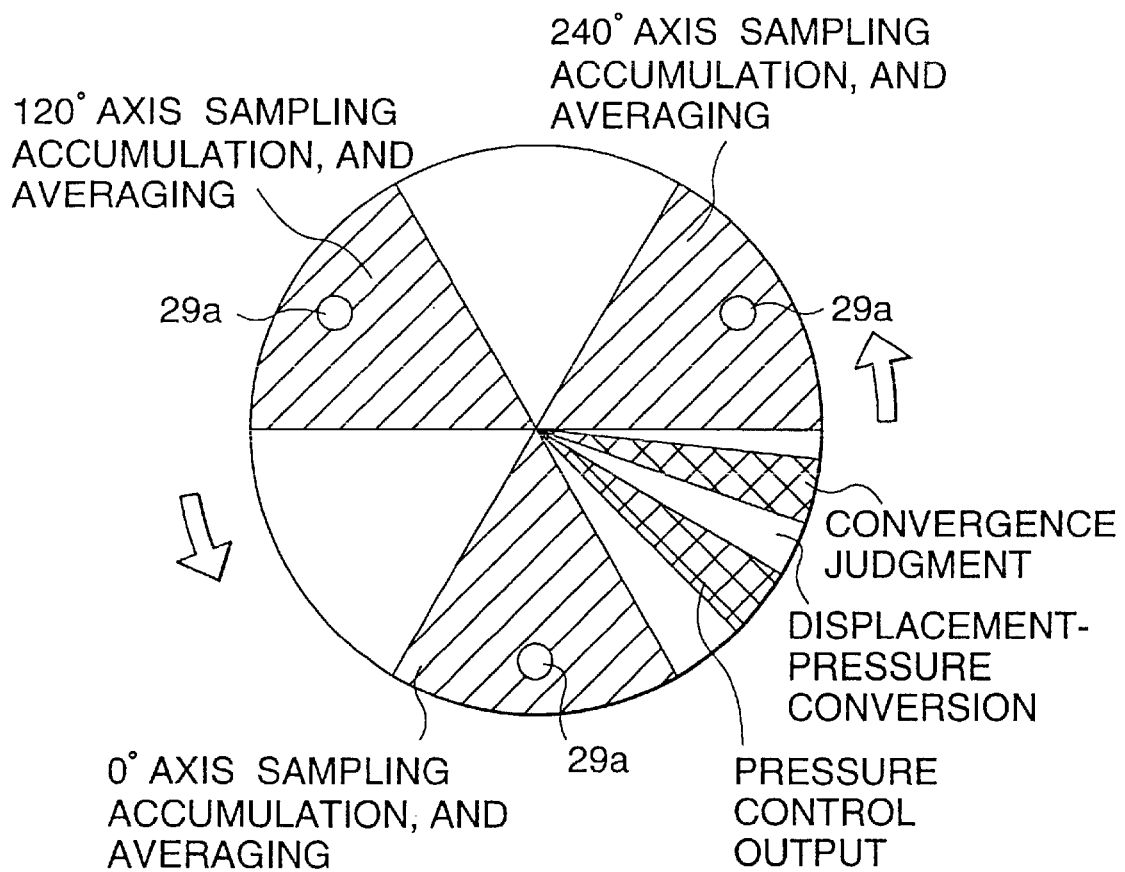
FIG. 24 is an operation chart showing a control method in the polishing apparatus having the tilting table mechanism.
Figure 26:
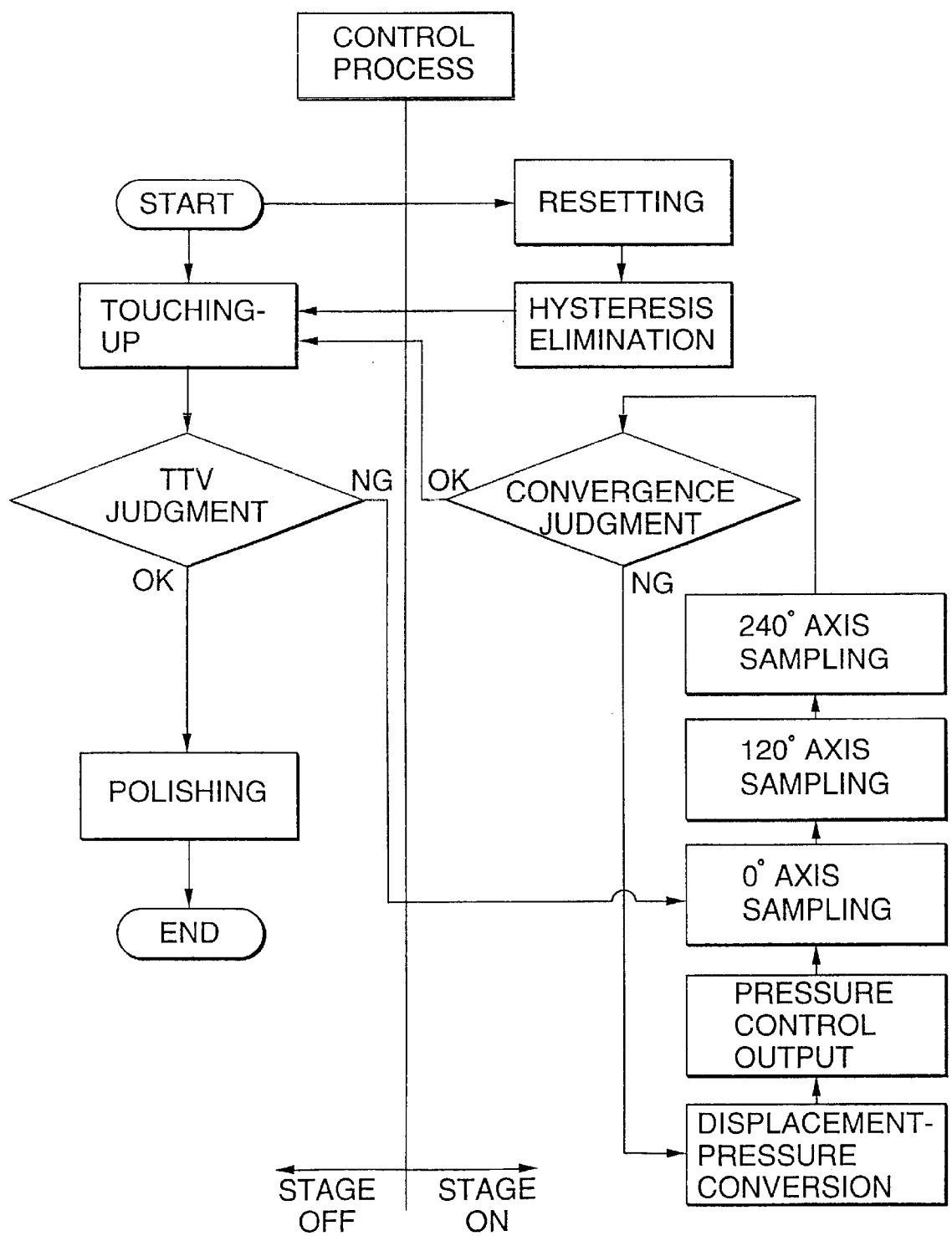
FIG. 26 is a flowchart showing a control method in the polishing apparatus having the tilting table mechanism.

Next, a control process will be described with reference to FIGS. 24–26. First, resetting is performed and hysteresis is eliminated. At this time, the regulator pressure of each electropneumatic regulator 55 is zero.

Then, the polishing wheel 5 is caused to touch up the wafer 2. Then, a TTV judgement is performed; specifically, it is judged whether a voltage variation width of a spindle load signal is within a prescribed value. If the TTV judgment result is OK, polishing is performed and finished.

Figure 27:
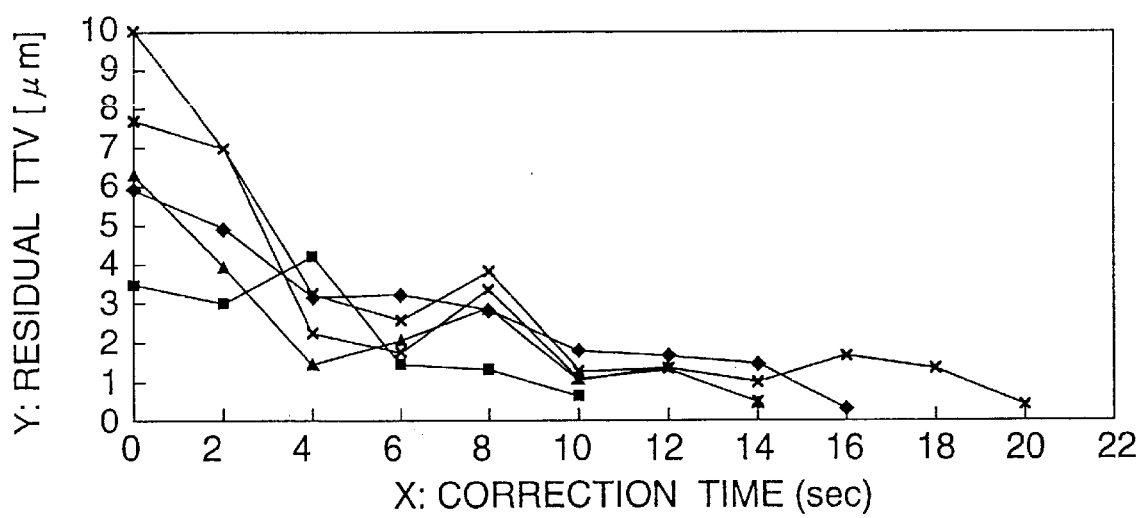
FIG. 27 is a graph showing relationships between the correction time and the residual TTV in the polishing apparatus having the tilting table mechanism.

On the other hand, if the TTV judgment result is NG, loads of the 0° axis, 120° axis, and 240° axis are determined and a convergence judgment is performed. If the convergence judgment result is OK, ordinary polishing is performed. If it is NG, displacement-pressure conversion and pressure control output are performed for each of the 0° axis, 120° axis, and 240° axis to cause the actuators 29a to operate. This operation is repeated until the convergence judgment result turns OK. FIG. 27 shows measurement results of actual corrections.

Figure 28:
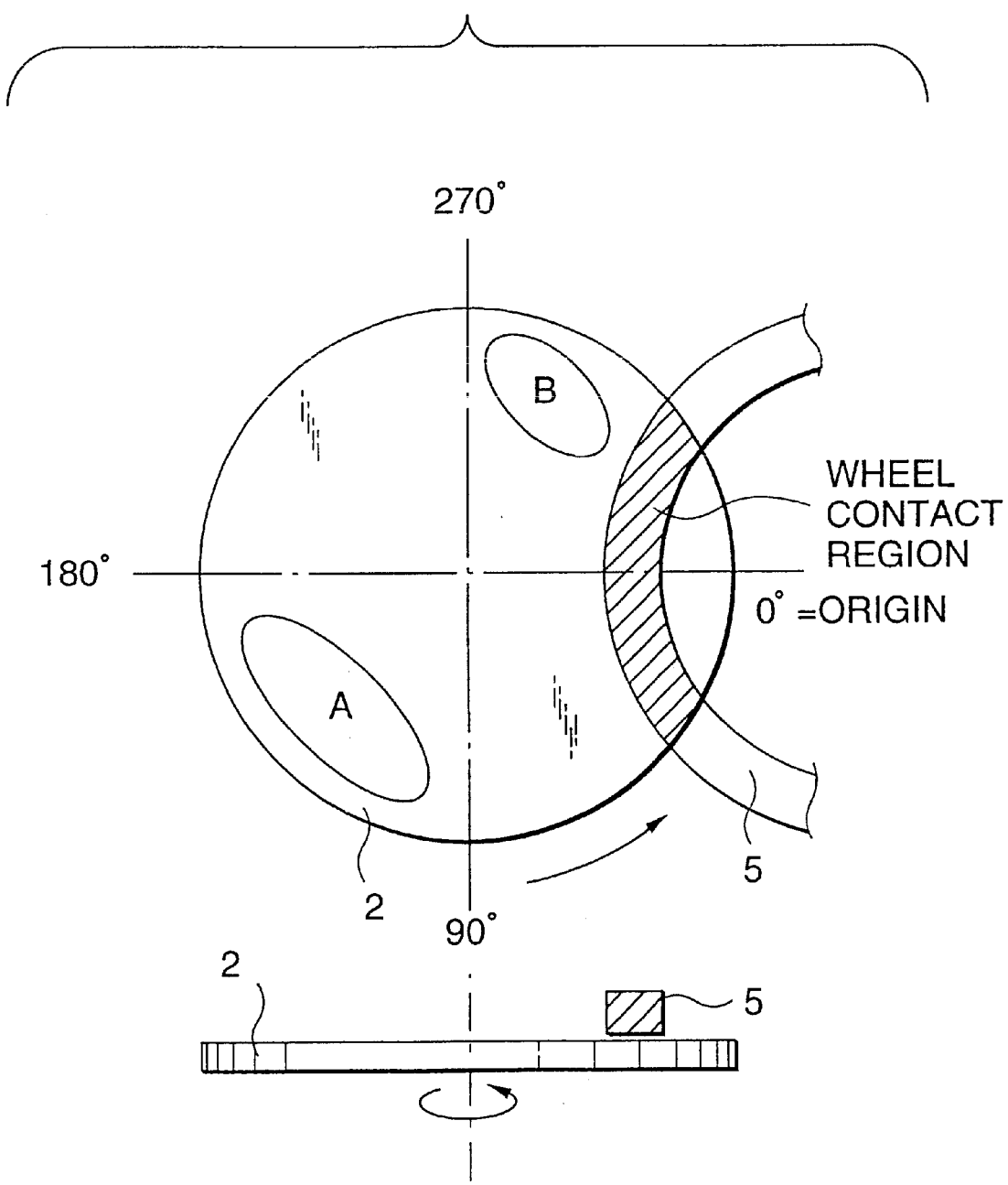
FIG. 28 is a plan view and a side view showing a function of a rotation speed correction mechanism section of a polishing apparatus according to the invention.
Figure 29:
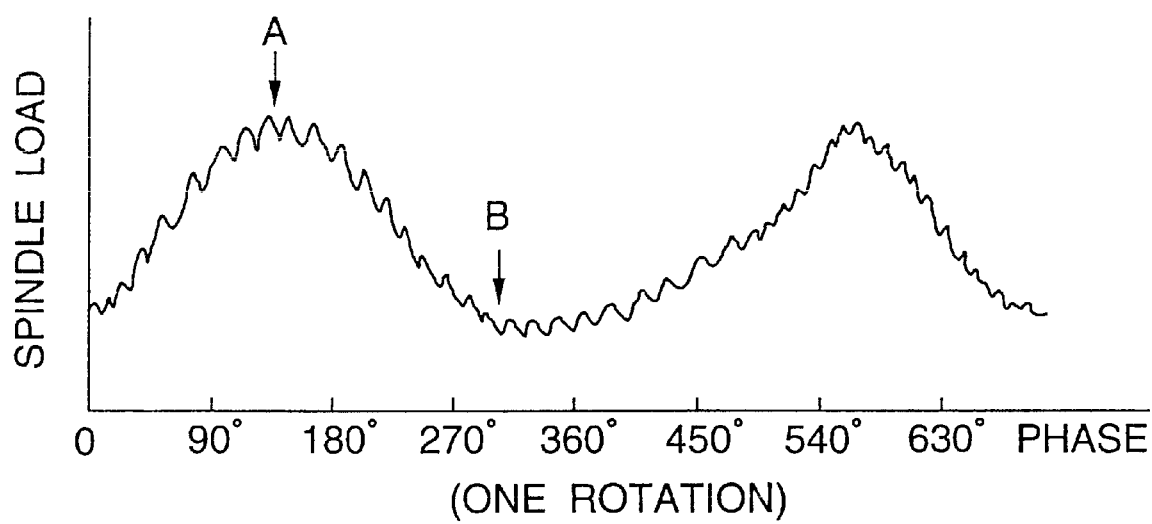
FIG. 29 is a graph showing spindle loads that occur when portion A and portion B shown in FIG. 28 are polished.

Several embodiments of the displacing mechanism section have been described above. A rotation speed correction mechanism section will now be described. The top surface of a wafer 2 has a height variation as shown in FIG. 28; portion A is high (the wafer 2 is thick there) and portion B is low (the wafer 2 is thin there). As shown in FIG. 29, when the polishing wheel 5 contacts portion A of the wafer 2, the spindle load value becomes large. Conversely, when the polishing wheel 5 contacts portion B, the spindle load value becomes small.

Figure 3B:
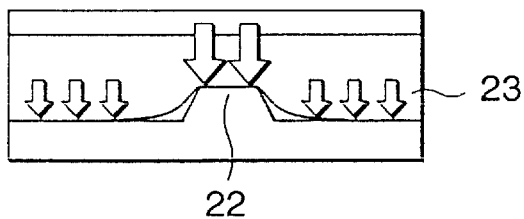
Figure 3C:
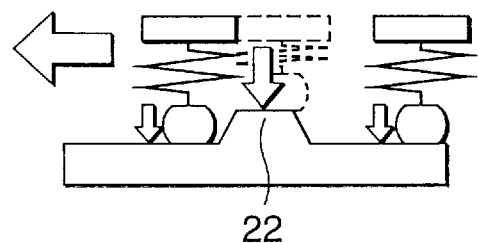
Figure 4:
FIG. 4 schematically shows a manner of wafer polishing.
Figure 30A:
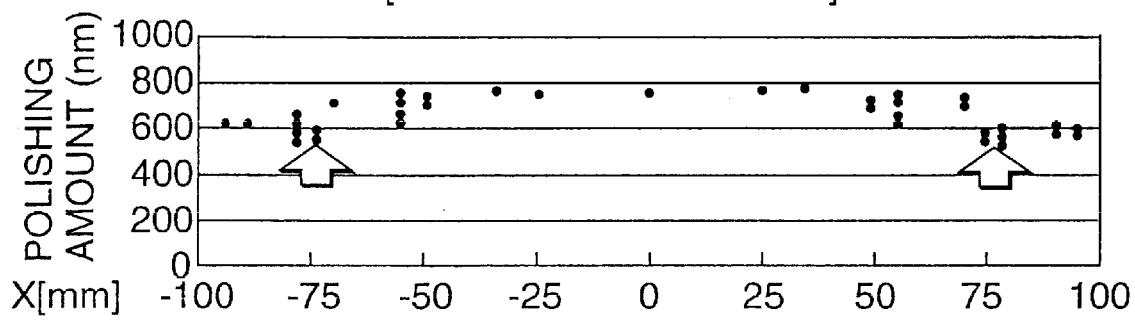
FIGS. 30(A) and 30(B) are graphs showing relationships between the polishing amount and the polishing speed in the polishing apparatus having the rotation speed correction mechanism section.
Figure 30B:
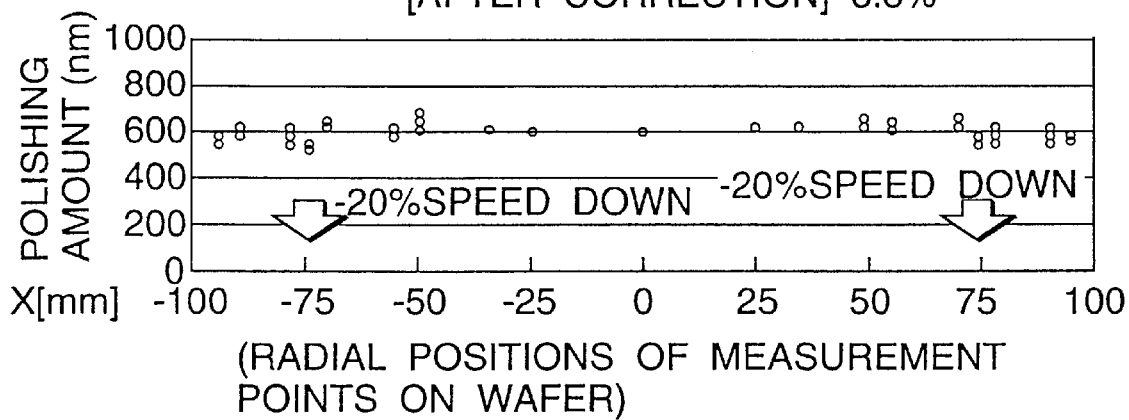

FIGS. 30(A) and 30(B) are graphs showing relationships between the radial positions on the wafer 2 (horizontal axis) and the polishing amount (vertical axis). The rotation speed of the polishing wheel 5 in the case of FIG. 30(B) is lower by about 20% than that in the case of FIG. 30(A). As seen from FIGS. 30(A) and 30(B), the polishing amount decreases approximately in proportion to the rotation speed. The dispersion of polishing amounts at the respective points on the wafer 2 also decreases as the rotation speed is decreased; the dispersion is 11.7% in the case of FIG. 30(A) and 3.8% in the case of FIG. 30(B). Based on these facts, the rotation speed correction mechanism section has a control mechanism for performing polishing in such a manner that the spindle load is detected and the rotation speed is increased in a phase range where the spindle load value is large and decreased in a phase range where the spindle load value is small. A description of a specific mechanism is omitted.

The height uniformity can be improved by using the above displacing mechanism section and the rotation speed correction mechanism section. The tool can be hardened so much more and hence the flatness can be improved. Further, since the polishing is performed smoothly, the polishing efficiency is increased, which shortens the working time and reduces the cost of a product.

Figure 2:
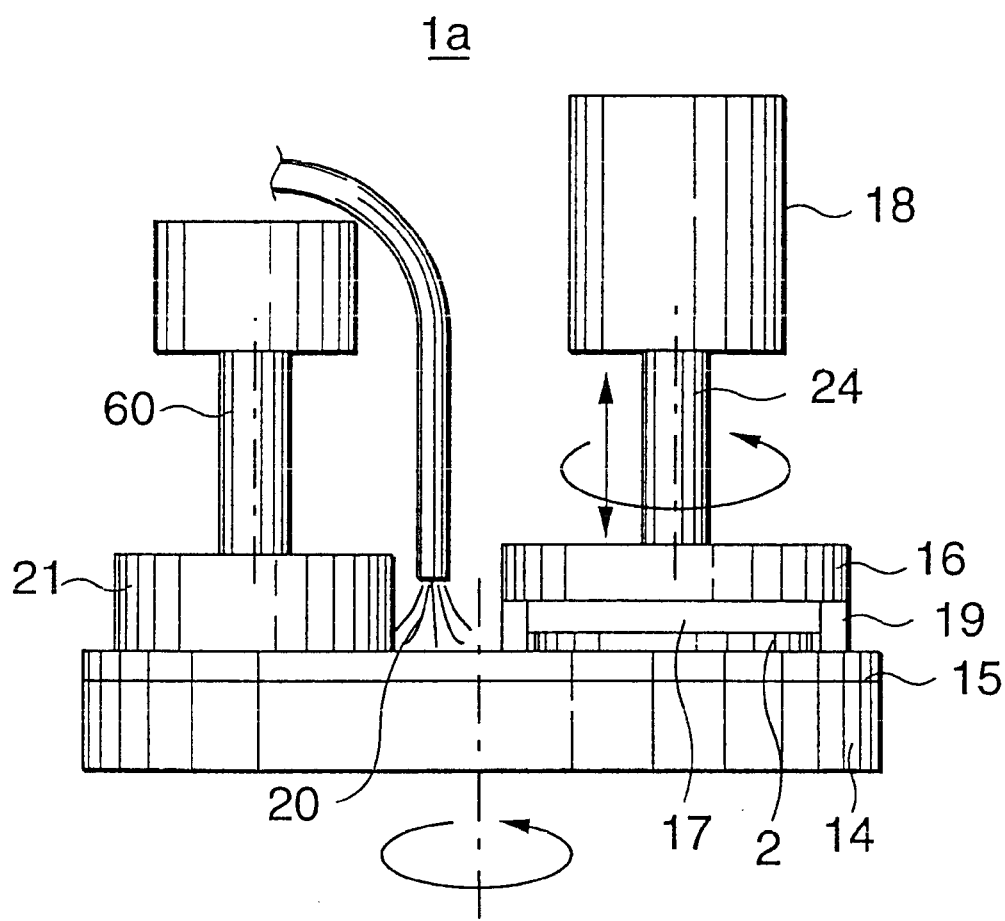
FIG. 2 is a front view outlining the configuration of another conventional polishing apparatus having a pad and a pad conditioner.

Next, a polishing apparatus according to an embodiment of the invention corresponding to the polishing apparatus 1a shown in FIG. 2 will be described with reference to FIGS. 31–33. The polishing apparatus of this embodiment has generally the same entire configuration as shown in FIG. 2. As described in the background section in connection with FIG. 7, a slight deviation in parallelism exists between the polishing axis 24 and the pad axis 25. The axis 60 (see FIG. 2) of the pad conditioner 21 and the pad axis 25 also have a deviation in parallelism. If polishing is performed in such a state, not only high-precision wafer working is not expected but also a problem may occur that the pad surface is damaged.

Figure 31:
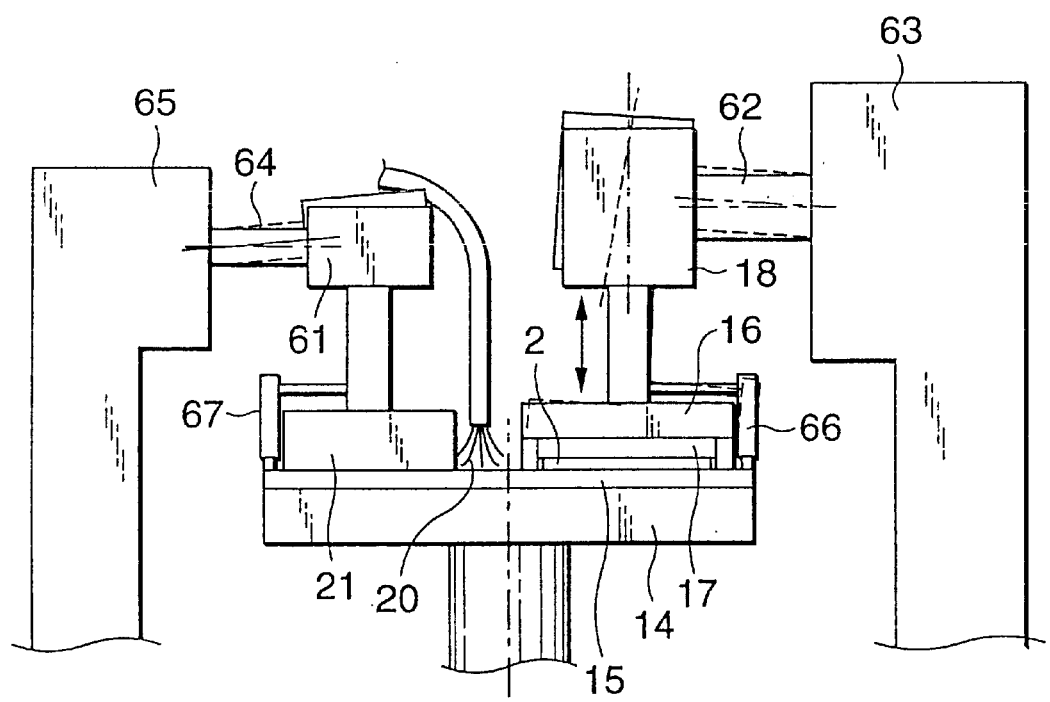
FIG. 31 is a front view showing a means for improving the uniformity of wafer polishing in a polishing apparatus using a pad and a pad conditioner.

FIG. 31 shows a specific means for making adjustments to correct such a deviation in parallelism (or squareness). The polishing head 16 side and the pad conditioner 21 side are provided with measuring devices 66 and 67 for measuring the surface shape of the pad 15, respectively. On the other hand, arms 62 and 64 are connected to the cylinder 18 of the polishing head 16 and the cylinder 61 of the pad conditioner 21, respectively. Swing units 63 and 65 are connected to the respective arms 62 and 64.

The swing units 63 and 65 are so configured as to slightly swing the arms 62 and 64 based on detection values of the surface shape of the pad 15 that are output from the measuring devices 66 and 67, respectively. A description of their specific configurations is omitted.

With the above configuration deviations in squareness of the polishing axis 24 of the polishing head 16 and the axis 60 of the conditioner 21 are corrected as shown in FIG. 31, whereby the wafer 2 and the pad conditioner 21 contact the pad 15 squarely.

Figure 32:
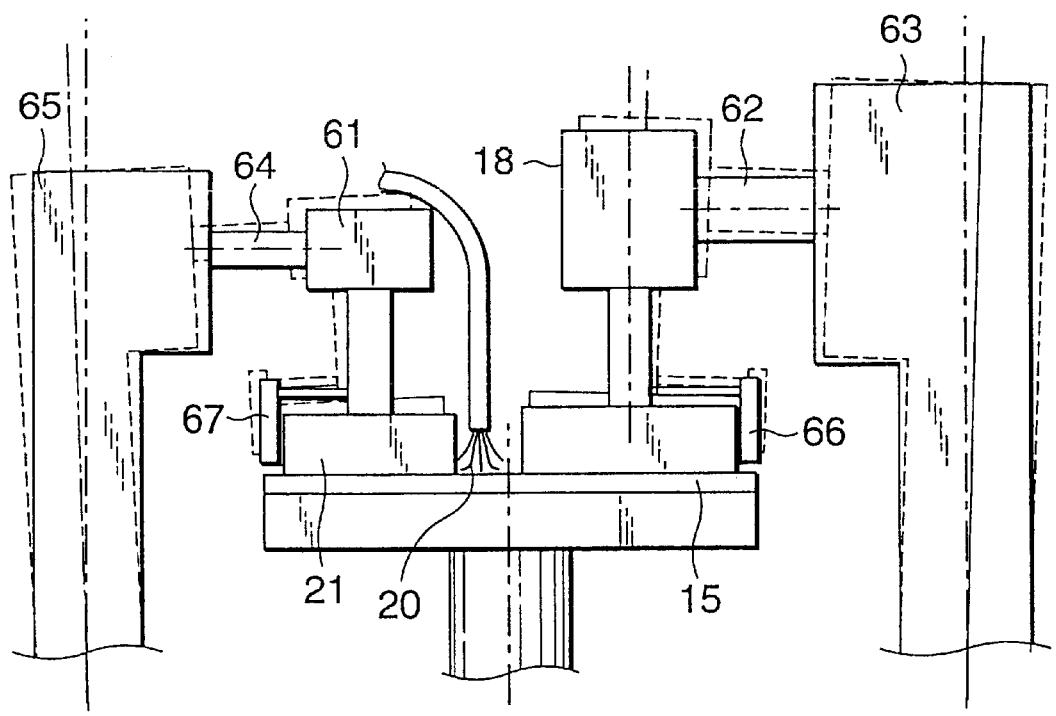
FIG. 32 is a front view showing another means for improving the uniformity of wafer polishing in a polishing apparatus using a pad and a pad conditioner.
Figure 33:
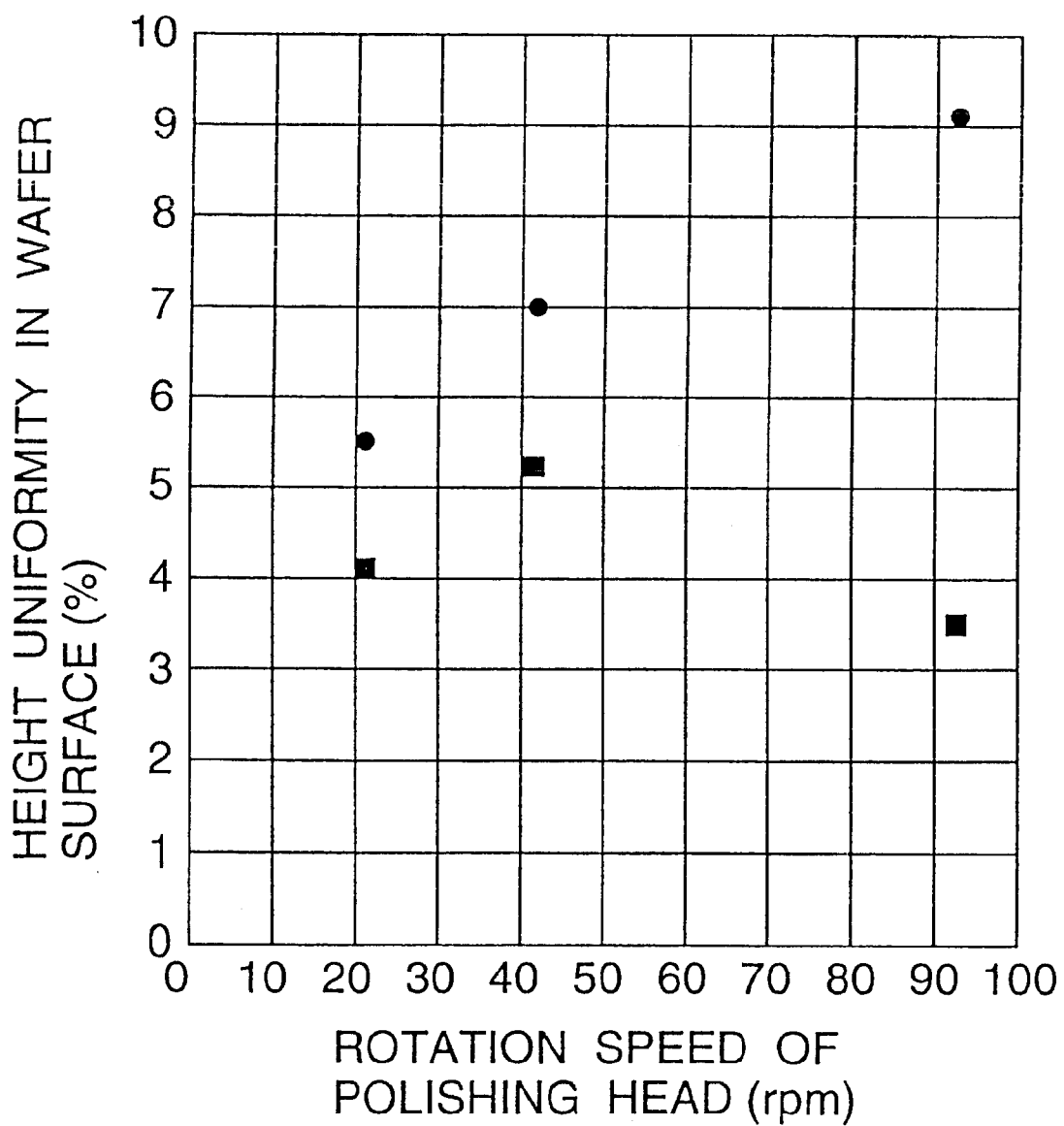
FIG. 33 is a graph showing polishing results of the polishing apparatuses of FIGS. 31 and 32.

FIG. 32 shows another embodiment. While in the embodiment of FIG. 31 the arms 62 and 64 are swung, in this embodiment the arms 62 and 64 are fixed and the swing units 63 and 65 are swung. This adjusting means can provide the same effect as in the embodiment of FIG. 31. FIG. 33 shows a relationship between the rotation speed (rpm; horizontal axis) of the polishing head 16 and the height uniformity in the wafer surface (vertical axis). Marks "●" correspond to a case where the adjusting means of this embodiment is not used and marks "■" correspond to a case where the adjusting means of this embodiment is used. It is seen from FIG. 33 that the height uniformity is greatly improved for all rotation speed values of the polishing head 16. The improvement in height uniformity is most remarkable at the highest rotation speed value.

According to the invention, the height uniformity can be improved and hence the production yield can be increased. The tool can be hardened and hence the flatness can be improved. Since the film forming thickness can be reduced, the working time can be shortened, the error can be reduced, and the cost can be reduced. Since a dummy pattern is no longer necessary, the device characteristics can be improved. Further, margins and freedom of designing can be increased. In the polishing apparatus using a pad conditioner, the pad life can be elongated and hence the cost due to consumption of pads can be reduced.

What is claimed is:

1. A polishing apparatus for polishing and finishing a workpiece so that the workpiece is made flat and uniform in height by pressing the workpiece being in contact with a surface of a table that is provided parallel with a horizontal surface by means of a polishing wheel that is opposed to the workpiece, comprising:

a tilting table mechanism for detecting a signal representing rotation torque of a spindle of the polishing wheel and adjusting a height, in a Z-axis direction, of the table that supports the workpiece mounted thereon in accordance with a detection value of the rotation torque signal, thereby uniformizing the rotation torque, for displacing a support side of the workpiece in accordance with working pressure;

a Z-axis slide for supporting the polishing wheel so that the polishing wheel is slidable in a Z-axis direction;

a feed shaft for feeding the polishing wheel in the Z-axis direction;

a Z-axis parallel leaf spring mechanism that is interposed between the Z-axis slide and the feed shaft for displacing a support side of the polishing wheel in accordance with working pressure.

2. The polishing apparatus according to claim 1, which further comprises:

a table rotation speed correction mechanism section for detecting a signal representing rotation torque of a spindle of the polishing wheel and adjusting a rotation speed of the table that supports the object mounted thereon in accordance with a detection value of the rotation torque signal, thereby uniformizing the rotation torque.

* * * * *

UNITED STATES PATENT AND TRADEMARK OFFICE
CERTIFICATE OF CORRECTION

PATENT NO. : 6,428,389 B2
DATED : August 6, 2002
INVENTOR(S) : Shuzo Sato

It is certified that error appears in the above-identified patent and that said Letters Patent is hereby corrected as shown below:

Title page,
Item [73], Assignee, should read -- [73] Assignee: Sony Corporation (Tokyo, JP) --.

Signed and Sealed this

Twenty-first Day of June, 2005

JON W. DUDAS
*Director of the United States Patent and Trademark Office*